United States Patent
Jiang

(10) Patent No.: US 12,137,364 B2
(45) Date of Patent: Nov. 5, 2024

(54) MEASUREMENT PROCESSING METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 310 days.

(21) Appl. No.: 17/688,264

(22) Filed: Mar. 7, 2022

(65) Prior Publication Data
US 2022/0191728 A1   Jun. 16, 2022

Related U.S. Application Data

(63) Continuation of application No. PCT/CN2019/104986, filed on Sep. 9, 2019.

(51) Int. Cl.
*H04W 24/10* (2009.01)
*H04B 17/336* (2015.01)
*H04W 76/20* (2018.01)

(52) U.S. Cl.
CPC .......... *H04W 24/10* (2013.01); *H04B 17/336* (2015.01); *H04W 76/20* (2018.02)

(58) Field of Classification Search
CPC ..... H04W 24/10; H04W 76/20; H04B 17/336
See application file for complete search history.

(56) References Cited

U.S. PATENT DOCUMENTS

| | | |
|---|---|---|
| 9,191,833 B2 | 11/2015 | Ahn et al. |
| 9,516,538 B2 | 12/2016 | Ahn et al. |
| 9,955,376 B2 | 4/2018 | Ahn et al. |
| 10,405,229 B2 | 9/2019 | Kim et al. |
| 10,548,181 B2 * | 1/2020 | Siomina ................ H04W 76/28 |
| 2013/0231148 A1 * | 9/2013 | Ganapathi ............. H04B 15/00 455/501 |

(Continued)

FOREIGN PATENT DOCUMENTS

| | | |
|---|---|---|
| CN | 104219695 A | 12/2014 |
| CN | 104521284 A | 4/2015 |

(Continued)

OTHER PUBLICATIONS

State Intellectual Property Office of the People's Republic of China, Office Action and Search Report Issued in Application No. 2019800020171, Sep. 23, 2021, 9 pages. (Submitted with Machine/Partial Translation).

(Continued)

*Primary Examiner* — Deepa Belur
(74) *Attorney, Agent, or Firm* — Volpe Koenig

(57) ABSTRACT

Embodiments of the present disclosure provide measurement processing methods and apparatuses. The method includes: a user equipment (UE) receives measurement configuration information for an idle state or inactive state and obtains a measurement result by performing signal quality measurement in the idle state or inactive state based on the measurement configuration information; the UE records the measurement result of free from IDC interference in response to detecting In-Device Coexistence (IDC) interference in the UE during the signal quality measurement.

17 Claims, 4 Drawing Sheets

(56) References Cited

U.S. PATENT DOCUMENTS

| | | | |
|---|---|---|---|
| 2013/0324172 A1 | 12/2013 | Ahn et al. | |
| 2015/0289156 A1* | 10/2015 | Jung | H04W 24/10 370/252 |
| 2016/0080964 A1 | 3/2016 | Ahn et al. | |
| 2017/0078908 A1 | 3/2017 | Ahn et al. | |
| 2017/0257794 A1 | 9/2017 | Kim et al. | |
| 2018/0206142 A1 | 7/2018 | Ahn et al. | |
| 2019/0200252 A1 | 6/2019 | Ahn et al. | |
| 2020/0154442 A1* | 5/2020 | Zhou | H04B 1/525 |
| 2020/0389937 A1* | 12/2020 | Liu | H04W 48/18 |
| 2021/0014704 A1* | 1/2021 | Zheng | H04W 48/12 |
| 2021/0029571 A1* | 1/2021 | Yang | H04W 48/16 |

FOREIGN PATENT DOCUMENTS

| | | | | |
|---|---|---|---|---|
| CN | 106060866 A | 10/2016 | | |
| CN | 106576004 A | 4/2017 | | |
| WO | WO-2013085256 A1 * | 6/2013 | | H04L 1/188 |
| WO | 2017/048024 A1 | 3/2017 | | |
| WO | WO-2021012111 A9 * | 3/2021 | | H04W 36/0066 |

OTHER PUBLICATIONS

ISA State Intellectual Property Office of the People's Republic of China, International Search Report Issued in Application No. PCT/CN2019/104986, May 27, 2020, WIPO, 6 pages.

VIVO, "IDC impact for early measurement", 3GPP TSG-RAN WG2 Meeting #106 Reno, USA, May 13-17, 2019, R2-1905821, 2 pages.

VIVO, "IDC impact for early measurement", 3GPP TSG-RAN WG2 Meeting #107 Prague, CZ, Aug. 26-30, 2019, R2-1909198 (Revision of R2-1905821), 2 pages.

* cited by examiner

MEASUREMENT PROCESSING METHOD AND APPARATUS

CROSS-REFERENCE TO RELATED APPLICATION

The present application is a U.S. Continuation Applications of International Application No. PCT/CN2019/104986, filed on Sep. 9, 2019, the contents of which are incorporated herein by reference in their entireties for all purposes.

TECHNICAL FIELD

The present disclosure relates to communication technologies, and in particular to measurement processing methods and apparatuses.

BACKGROUND

For interference problems that may be present between frequency bands of Long Term Evolution (LTE)/New Radio (NR) and Industrial Scientific Medical (ISM) in a device, LTE/NR introduces an In-Device Coexistence (IDC) solution. Specifically, when IDC interference is present and a User Equipment (UE) cannot eliminate this interference by itself, the UE reports IDC interference indication information to a network. The IDC interference indication information indicates which frequency bands are affected by the IDC interference and an indication of interference direction. For Up Link (UL) Carrier Aggregation (CA) and Multi-RAT Dural-Connectivity (DC), the UE reports an affected carrier combination. Further, the UE may report Time Division Multiplexing (TDM) assistance information such that the network may select an appropriate parameter when adopting the TDM solution. The coexistence interference reported by the UE may be an ongoing coexistence interference or a coexistence interference anticipated to occur in the future. After receiving a coexistence interference indication from the UE, the LTE network may adopt TDM or Frequency Division Multiplexing (FDM) solution to solve the problem of coexistence interference.

The LTE and New Radio (NR) introduce DC-CA enhancement. One enhancement point in the DC-CA enhancement is that a network configures, by a Radio Resource Control (RRC) release message, a UE to measure some carrier signals while the UE is in an idle/inactive state and to report a measurement result to the network during the UE's next access to the network. The network determines whether to configure CA or DC based on the reported measurement result. If an IDC problem occurs in the UE, the measurement result could be affected by the IDC and thus a real cell signal quality cannot be accurately assessed, affecting resource allocation of the network for the UE.

SUMMARY

The present disclosure provides measurement processing methods and apparatuses.

According to a first aspect of embodiments of the present disclosure, there is provided a measurement processing method. The method includes: receiving, by user equipment (UE), measurement configuration information for an idle state or inactive state; based on the measurement configuration information, obtaining, by the UE, a measurement result by performing signal quality measurement in the idle state or inactive state; in response to detecting in-device coexistence (IDC) interference in the UE during the signal quality measurement, recording, by the UE, a measurement result of free from IDC interference.

According to a second aspect of embodiments of the present disclosure, there is provided a measurement processing method. The method includes: distributing, by a base station, measurement configuration information for an idle state or inactive state; where the measurement configuration information is used to instruct a user equipment (UE) to obtain a measurement result by performing signal quality measurement in the idle state or inactive state based on the measurement configuration information, where the measurement result is a measurement result of free from in-device coexistence (IDC) interference.

According to a third aspect of embodiments of the present disclosure, there is provided a measurement processing apparatus, The apparatus includes: a processor; a memory configured to store processor-executable instructions; when the processor executes the processor-executable instructions, the processor is configured to perform operations including: receiving measurement configuration information for an idle state or inactive state; based on the measurement configuration information, obtaining a measurement result by performing signal quality measurement in the idle state or inactive state; and in response to detecting in-device coexistence (IDC) interference in the UE during the signal quality measurement, recording a measurement result of free from IDC interference.

BRIEF DESCRIPTION OF THE DRAWINGS

The accompanying drawings, which are incorporated in and constitute a part of the present specification, illustrate embodiments consistent with the present disclosure and serve to explain the principles of the present disclosure together with the description.

DETAILED DESCRIPTION OF THE EMBODIMENTS

Figure 1:
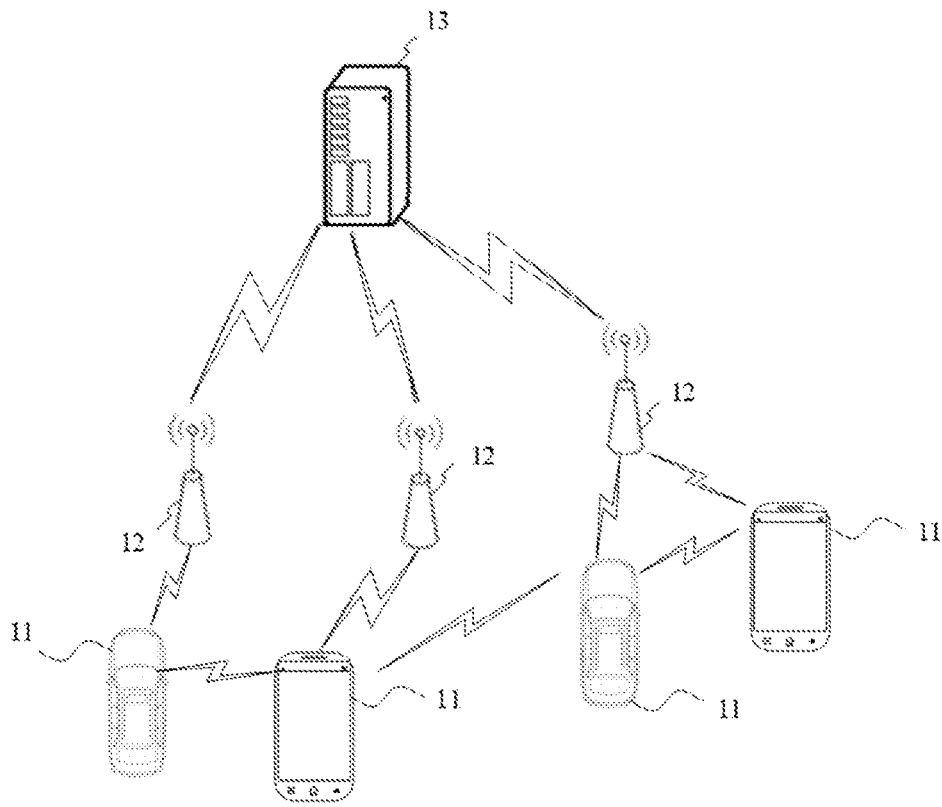
FIG. 1 is a pictorial diagram illustrating a wireless communication system according to an embodiment of the present disclosure.

Embodiments will be described in detail herein, with the illustrations of the embodiments represented in the drawings. When the following descriptions involve the drawings, like numerals in different drawing figures refer to like or similar elements unless otherwise indicated. The implementations described in the following embodiments do not represent all possible implementations consistent with the present disclosure. Rather, they are merely examples of apparatuses and methods consistent with some aspects of the present disclosure as detailed in the appended claims.

The terms used in the present disclosure are for the purpose of describing particular embodiments only, and are not intended to limit the present disclosure. Terms "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

FIG. 1 is a pictorial diagram illustrating a wireless communication system according to an embodiment of the present disclosure. As shown in FIG. 1, the wireless communication system is a communication system based on cellular mobile communication technology. The wireless communication system may include several terminals 11 and several base stations 12.

The terminal 11 may be a device providing voice and/or data connectivity to a user. The terminal 11 may communicate with one or more core networks through a Radio Access Network (RAN). The terminal 11 may be a terminal in Internet of Things (IoT), such as a sensor device, a mobile phone (cellular phone), and a computer having a terminal of Internet of Things, such as a fixed, portable, pocket-size, handheld, or computer-inbuilt or vehicle-mounted apparatus. The terminal 11 may be, for example, a STAtion (STA), a subscriber unit, a subscriber station, a mobile station, a mobile, a remote station, an access point, a remote terminal, an access terminal, a user terminal, a user agent, a user device, or a user equipment. In some examples the terminal 11 may be a device carried on an unmanned aerial vehicle (UAV), or a vehicle-mounted device. For example, the terminal 11 may be a trip computer having a wireless communication function or a wireless communication device externally connected to a trip computer. In some examples, the terminal 11 may be a roadside device. Examples of roadside devices include, a road lamp, a signal lamp or other roadside devices having wireless communication function.

The base station 12 may be a network side device in the wireless communication system. The wireless communication system may be a 4th-generation mobile communication technology (4G) system, which is also called Long Term Evolution (LTE) system. In some examples, the wireless communication system may also be a 5G system, which is also called New Radio (NR) system or 5G NR system. In some examples, the wireless communication system may also be a next generation system of the 5G system. An access network in the 5G system may be referred to as New Generation-Radio Access Network (NG-RAN). In some examples, the wireless communication system may also be a Machine-Type Communication (MTC) system.

The base station 12 may be an evolved Node B (eNB) base station employed in the 4G system. In some examples, the base station 12 may also be a base station (gNB) adopting centralized-distributed architecture in the 5G system. When adopting the centralized distributed architecture, the base station 12 usually includes a Central Unit (CU) and at least two Distributed Units (DUs). In the Central Unit, protocol stacks of a Packet Data Convergence Protocol (PDCP) layer, a Radio Link Control (RLC) layer and a Media Access Control (MAC) layer are disposed. In the Distributed Unit(s), a protocol stack of a Physical (PHY) layer is disposed. Specific implementations of the base station 12 are not limited in the embodiments of the present disclosure.

Wireless connection between the base station 12 and the terminal 11 may be established through an air interface. In different implementations, the air interface is an air interface based on the 4th-generation mobile communication network technology (4G) standard. Or, the air interface may be an air interface based on the fifth generation mobile communication network technology (5G) standard. For example, the air interface may be a New Radio air interface. The air interface may also be an air interface based on standards of a next generation mobile communication network technology of 5G.

In some embodiments, End to End (E2E) connection may further be established between the terminals 11. For example, E2E connection may be established in the scenarios of Vehicle to Vehicle (V2V) communication, Vehicle to Infrastructure (V2I) communication, and Vehicle to Pedestrian (V2P) communication and the like, in Vehicle to everything (V2X) communication.

In some embodiments, the above wireless communication system may further include a network management device 13. Several base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network device, such as Serving GateWay (SGW), Public Data Network GateWay (PGW), Policy and Charging Rules Function (PCRF), or Home Subscriber Server (HSS) and the like. The implementation of the network management device 13 is not limited to the particular embodiments of the present disclosure.

Because modules that communicate in LTE frequency bands and modules that communicate in ISM frequency bands (for example, WiFi//Bluetooth/GNSS adopt ISM frequency band) are present at the same time in one device, mutual interference may occur between them during signal transmission/reception. In this case signals cannot be correctly received, thus affecting normal operation. For interference problems between LTE and ISM frequency bands in the device, LTE introduces an In-Device Coexistence (IDC) solution. Specifically, when IDC interference occurs and a User Equipment (UE) cannot eliminate this interference by itself, the UE reports the IDC interference indication information to a network. The IDC interference indication information indicates which frequency bands are affected by the IDC interference and an interference direction (e.g., LTE interferes with ISM, or ISM interferes with LTE, or both interfere with each other). For Up Link (UL) Carrier Aggregation (CA) and Multi-RAT Dural-Connectivity (DC), the UE reports an affected carrier combination (intermodulation interference and harmonic interference). Further, the UE may report Time Division Multiplexing (TDM) assistance information such that the network may select an appropriate parameter when adopting the TDM solution. The coexistence interference reported by the UE may be an ongoing coexistence interference or a coexistence interference that is anticipated to occur in the future. After receiving a coexistence interference indication from the UE, the network may adopt TDM or Frequency Division Multiplexing (FDM) to solve the problem of coexistence interference.

LTE and New Radio (NR) introduce a DC-CA enhancement. One enhancement point in the DC-CA enhancement is that a network configures a UE through a Radio Resource Control (RRC) release message. The network configures the UE to measure some carrier signals while the UE is in an idle/inactive state and to report a measurement result to the network during the UE's next access to the network. The network determines whether to configure CA or DC based on the reported measurement result. This enhancement allows the UE to perform carrier measurement in advance, e.g., while the UE is in an idle or inactive state, thus reducing a delay that would otherwise result from the measurement being carried out after the UE enters the connected state. In this way, the network can configure CA or DC more quickly.

In the above wireless communication system, if an IDC problem occurs in the UE, the IDC problem may contaminate the signal measurement result. In that case a real cell signal quality cannot be accurately assessed. In this case, the network cannot determine whether to configure Carrier Aggregation (CA) and/or Dual-Connectivity (DC) because of the contaminated measurement result. In view of this, the present disclosure provides the following embodiments.

Figure 2:
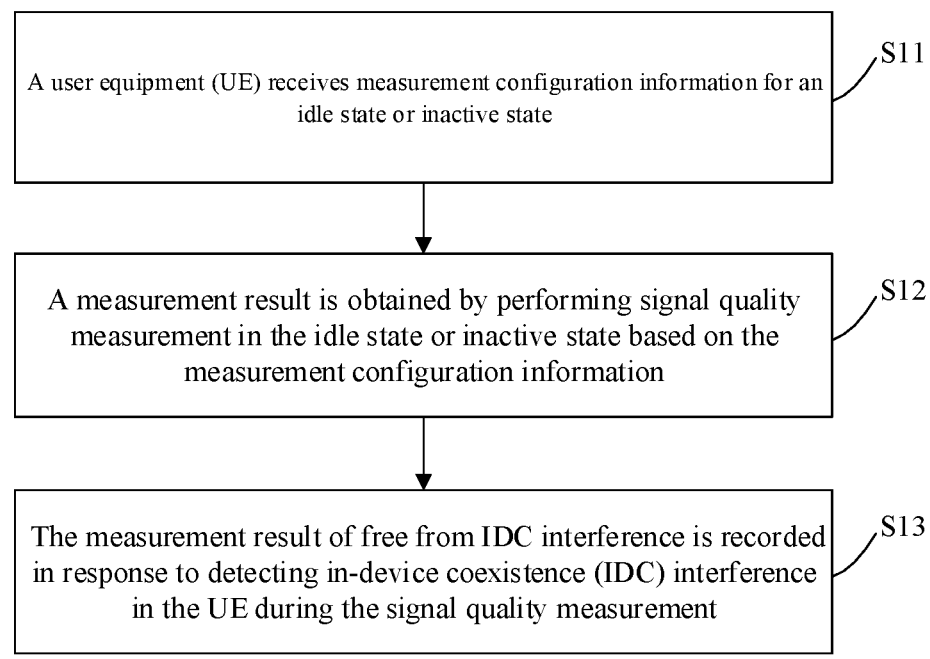
FIG. 2 is a first flowchart illustrating a measurement processing method according to an embodiment of the present disclosure.

FIG. 2 is a first flowchart illustrating a measurement processing method according to an embodiment of the present disclosure. As shown in FIG. 2, the measurement processing method is applied to a user equipment (UE). The method includes the following steps.

At step S11, a user equipment (UE) receives measurement configuration information for an idle state or inactive state.

At step S12, based on the measurement configuration information, the UE obtains a measurement result by performing a signal quality measurement in the idle state or inactive state.

At step S13, in response to detecting In-Device Coexistence (IDC) interference occurs in the UE during performing the signal quality measurement, the measurement result of free from IDC interference may be recorded.

This approach facilitates providing data basis for reporting the measurement result of free from IDC interference to a network device by the UE. In some embodiments, when the UE performs signal quality measurement corresponding to a first frequency band signal in the idle state or inactive state, sending a second frequency band signal is stopped, where the second frequency band signal is an interference signal of the first frequency band signal.

For example, the first frequency band may be an ISM frequency band, and the second frequency band may be an LTE frequency band or NR frequency band. In this way, the measurement result will be free from the IDC interference.

In some embodiments, when the UE does not send the second frequency band signal, the UE performs signal quality measurement of the first frequency band signal in the idle state or inactive state. In this way, the measurement result will be free from the IDC interference.

In some embodiments, the method further includes: establishing a connection with a network device to enter a connected state; and in response to entering the connected state, the UE reports the measurement result of free from IDC interference to the network device. In this way, the UE can report a clean measurement result of free from IDC interference to the network device, such that the network device may determine whether to configure Carrier Aggregation and/or Dual Connectivity based on the measurement result of free from IDC interference.

In some embodiments, before reporting the measurement result of free from IDC interference, the method further includes: reporting a measurement result of one or more cells available in the idle state or inactive state; when reporting the measurement result of one or more cells available in the idle state or inactive state, in response to detecting IDC interference still in the UE, a detection result that the IDC interference is detected is reported.

In some embodiments, when reporting the measurement result of free from IDC interference, the method further includes: in response to detecting IDC interference still in the UE, reporting a detection result that the IDC interference is detected.

In some embodiments, the method further includes: performing, by the UE, IDC interference elimination; when IDC interference is still detected after the IDC interference elimination is performed, in response to entering the connected state, reporting the detection result that the IDC interference is still detected.

In some examples, the IDC interference is detected includes at least one of: the IDC interference is detected on a resident frequency point; or, the IDC interference is detected in an idle state or inactive state.

In some examples, the UE reports the detection result that the IDC interference is detected through an RRC connection establishment completion message or RRC connection recovery completion message or RRC connection re-establishment completion message.

In some examples, the UE reports the detection result that the IDC interference is detected through a connection establishment request or connection recovery request or connection re-establishment request message.

In this case, in response to the UE detecting IDC interference still after the UE performs the IDC interference elimination, the UE reports to the network device a detection result indicating that the IDC interference is detected to request the network device to determine a solution for eliminating the IDC interference.

In some examples, the UE performs IDC interference elimination may include: reducing a transmission power of a transmitting module; or, switching a working frequency of a communication module to another frequency.

In some embodiments, the method further includes: when recording the measurement result of free from IDC interference, in response to detecting IDC interference in the UE, recording a detection result that the IDC interference is detected.

Thus, when the measurement result of free from IDC interference is recorded, the detection result that the IDC interference is detected is recorded at the same time. In this case, when the measurement result of free from IDC interference is reported to the network device, the detection result that the IDC interference is detected is reported to the network device at the same time to request the network device to determine a solution for eliminating the IDC interference.

In some embodiments, the method further includes: when reporting the measurement result of free from IDC interference, reporting a detection result that the IDC interference is detected.

Thus, when the measurement result of free from IDC interference is reported to the network device, the detection result that the IDC interference is detected is reported to the network device at the same time to request the network device to determine a solution of IDC interference elimination.

In some embodiments, the method further includes receiving an IDC indication request and sending IDC interference indication information based on the IDC indication request. The IDC interference indication information is used for the network device to determine a solution of IDC interference elimination.

In some embodiments, the IDC indication request may be carried in a UE information request message or may be a preset Radio Resource Control (RRC) message. Correspondingly, the IDC interference indication information may be carried in a UE information response message or may be a preset RRC message.

In some embodiments, reporting the detection result that the IDC interference is detected further includes: for each carrier frequency subjected to the IDC interference, reporting a detection result indicating that the IDC interference is detected.

In this way, the network device may easily know a situation of each carrier frequency subjected to the IDC interference and determine a solution of IDC interference elimination more easily.

In some embodiments, reporting the detection result that the IDC interference is detected further includes: for each cell subjected to the IDC interference, reporting a detection result indicating that the IDC interference is detected.

In this way, the network device may easily know a situation of each cell subjected to the IDC interference and determine a solution for eliminating the IDC interference more easily.

In the technical solution of the embodiments of the present disclosure, a UE receives measurement configuration information for an idle state or inactive state and obtains a measurement result by performing signal quality measurement in the idle state or inactive state based on the measurement configuration information. In response to detecting IDC interference in the UE during the signal quality measurement, the UE records and reports the measurement result of free from IDC interference. In this way, the UE can report a clean measurement result of free from IDC interference to the network device such that the network device determines whether to configure Carrier Aggregation and/or Dual Connectivity based on the measurement result of free from IDC interference.

Figure 3:
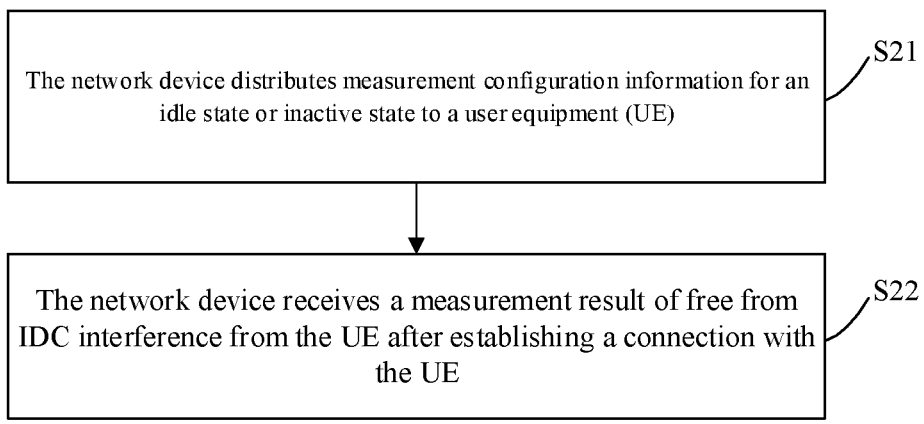
FIG. 3 is a second flowchart illustrating a measurement processing method according to an embodiment of the present disclosure.

FIG. 3 is a second flowchart illustrating a measurement processing method according to an embodiment of the present disclosure. As shown in FIG. 3, the measurement processing method may be applied to a network device such as a base station. The method includes the following steps.

At step S21, the network device distributes measurement configuration information for an idle state or inactive state to a user equipment (UE).

The measurement configuration information is used to instruct the UE to obtain a measurement result by performing signal quality measurement in the idle state or inactive state based on the measurement configuration information, where the measurement result is a measurement result of free from In-Device Coexistence (IDC) interference.

At step S22, after establishing a connection with the UE, the network device receives from the UE a measurement result of free from IDC interference.

In this case, the network device determines whether to configure Carrier Aggregation and/or Dual Connectivity based on the measurement result of free from IDC interference.

In some embodiments, the method further includes: receiving from the UE a detection result that the IDC interference is detected.

In this way, when receiving the detection result reported by the UE that the IDC interference is detected, the network device provides a solution for the UE to eliminate the IDC interference.

In some embodiments, the method further includes: sending an IDC indication request to the UE based on the detection result of the IDC interference; receiving IDC interference indication information from the UE; determining a solution of IDC interference elimination based on the IDC interference indication information.

In this way, the network device may be helped to quickly determine a solution of IDC interference elimination.

In some embodiments, the IDC indication request may be carried in a UE information request message or may be a preset Radio Resource Control (RRC) message. Correspondingly, the IDC interference indication information may be carried in a UE information response message or may be a preset RRC message.

In the technical solution of the embodiments of the present disclosure, the network device can determine whether to configure Carrier Aggregation and/or Dual Connectivity based on the clean measurement result of free from IDC interference.

Figure 4:
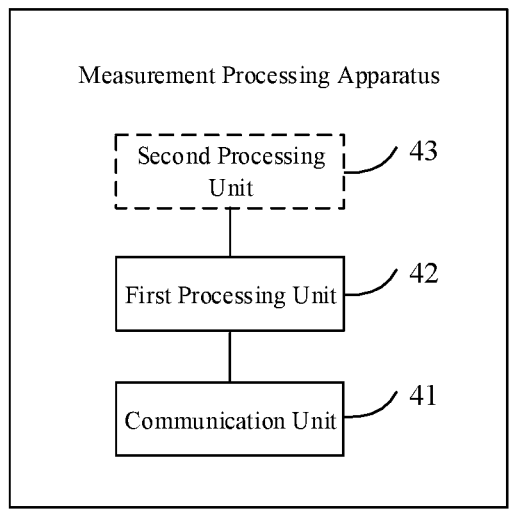
FIG. 4 is a first block diagram illustrating a measurement processing apparatus according to an embodiment of the present disclosure.

FIG. 4 is a first block diagram illustrating a measurement processing apparatus according to an embodiment of the present disclosure. The measurement processing apparatus is applied to a user equipment (UE) side. As shown in FIG. 4, the apparatus includes: a communication unit 41, configured to receive measurement configuration information for an idle state or inactive state; a first processing unit 42, configured to obtain a measurement result by performing signal quality measurement in the idle state or inactive state based on the measurement configuration information; in response to detecting in-device coexistence (IDC) interference in the UE during the signal quality measurement, record the measurement result of free from IDC interference.

In the above solution, the first processing unit 42 is further configured to: establish a connection with a network device to enter a connected state; in response to entering the connected state, report the measurement result of free from IDC interference to the network device through the communication unit.

In some embodiments, the communication unit 41 is further configured to: before reporting the measurement result of free from IDC interference to the network device, report a measurement result of one or more cells available in the idle state or inactive state to the network device; where, when the measurement result of one or more cells available in the idle state or inactive state is reported, if the first processing unit still detects IDC interference in the UE, a detection result that the IDC interference is detected is reported to the network device.

In some embodiments, the communication unit 41 is further configured to: when the measurement result of free from IDC interference is reported, if the first processing unit still detects IDC interference in the UE, report a detection result that the IDC interference is detected to the network device.

In some embodiments, the apparatus further includes: a second processing unit 43, configured to perform IDC interference elimination; where the first processing unit is further configured to: when IDC interference is still detected after the IDC interference elimination is performed, in response to entering the connected state, report the detection result that the IDC interference is detected to the network device through the communication unit.

In the above solution, the first processing unit 42 is further configured to: when recording the measurement result of free from IDC interference, in response to detecting IDC interference in the UE, record a detection result that the IDC interference is detected.

In the above solution, the first processing unit 42 is further configured to: notify the communication unit to report the detection result that the IDC interference is detected when reporting the measurement result of free from IDC interference to the network device.

In the above solution, the communication unit 41 is further configured to receive an IDC indication request from the network device; the first processing unit 42 is further configured to determine IDC interference indication information based on the IDC indication request and send the IDC interference indication information to the network device through the communication unit, where the IDC interference indication information is used for the network device to determine a solution of IDC interference elimination.

In the above solution, the communication unit 41 is further configured to: when reporting the detection result that the IDC interference is detected, for each carrier frequency subjected to the IDC interference, report a detection result indicating that the IDC interference is detected.

In the above solution, the communication unit 41 is further configured to: for each cell subjected to the IDC interference, reporting a detection result indicating that the IDC interference is detected.

In the above solution, the first processing unit 42 is further configured to: when the UE performs signal quality measurement of a first frequency band signal in the idle state or inactive state, stop sending a second frequency band signal, where the second frequency band signal is an interference signal of the first frequency band signal; or, when the UE does not send the second frequency band signal, perform signal quality measurement of the first frequency band signal in the idle state or inactive state.

The specific manners in which various modules in the apparatus of the above embodiments perform operations are already described in details in the above method embodiments and will not be described herein.

In practical applications, the specific structures of the above communication unit 41, first processing unit 42 and second processing unit 43 may be implemented by the measurement processing apparatus or by a Central Processing Unit (CPU), a Micro Controller Unit (MCU), a Digital Signal Processor (DSP) or a Programmable Logic Controller (PLC) or the like in a terminal to which the measurement processing apparatus is loaded.

The measurement processing apparatus described in the embodiment may be disposed in a UE.

Those skilled in the art should understand that the functions of various processing modules in the measurement processing apparatus of the embodiments of the present disclosure may be understood by referring to relevant descriptions of the above measurement processing method applied to the UE, and various processing modules in the measurement processing apparatus of the embodiments of the present disclosure may be implemented using analog circuits for performing the functions described in the embodiments of the present disclosure, or by running a terminal including a processor executing instructions corresponding to software for implementing the functions described in the embodiments of the present disclosure.

The measurement processing apparatus in the embodiments of the present disclosure can help a UE to report a clean measurement result of free from IDC interference to a network device.

Figure 5:
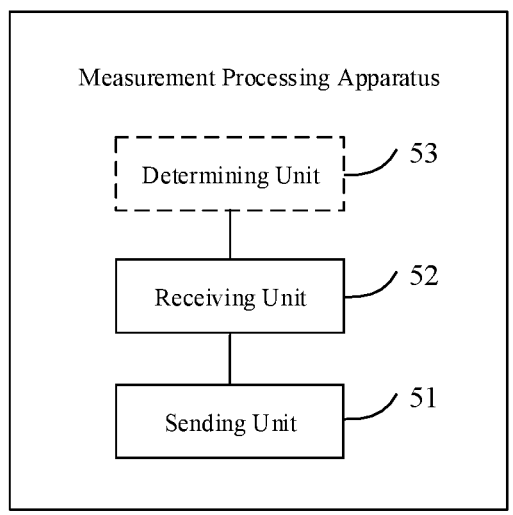
FIG. 5 is a second block diagram illustrating a measurement processing apparatus according to an embodiment of the present disclosure.

FIG. 5 is a second block diagram illustrating a measurement processing apparatus according to an embodiment of the present disclosure. The measurement processing apparatus is applied to a network device side. As shown in FIG. 5, the apparatus includes a sending unit 51.

The sending unit 51 is configured to distribute measurement configuration information for an idle state or inactive state to a user equipment (UE); where the measurement configuration information is used to instruct the UE to obtain a measurement result by performing signal quality measurement in the idle state or inactive state based on the measurement configuration information, where the measurement result is a measurement result of free from in-device coexistence (IDC) interference.

In the above solution, the apparatus further includes: a receiving unit 52, configured to, after establishing a connection with the UE, receive the measurement result of free from IDC interference from the UE.

In the above solution, the receiving unit 52 is further configured to: receive a detection result that the IDC interference is detected from the UE.

In the above solution, the sending unit 51 is further configured to send an IDC indication request to the UE based on a detection result of the IDC interference; the receiving unit 52 is further configured to receive IDC interference indication information from the UE; the apparatus further includes: a determining unit 53, configured to determine a solution of IDC interference elimination based on the IDC interference indication information.

In the above solution, the IDC indication request may be carried in a UE information request message or may be a preset Radio Resource Control (RRC) message. Correspondingly, the IDC interference indication information may be carried in a UE information response message or may be a preset RRC message.

The specific manners in which various modules in the apparatus of the above embodiments perform operations are already described in details in the above method embodiments and will not be described herein.

In practical applications, the specific structures of the above sending unit 51, receiving unit 52 and determining unit 53 may be implemented by the measurement processing apparatus or by a CPU, MCU, DSP or PLC or the like in a network device in which the measurement processing apparatus is implemented.

The measurement processing apparatus described in the embodiment may be disposed in a network device, e.g., a device on the network side, such as a base station.

Those skilled in the art should understand that the functions of various processing modules in the measurement processing apparatus of the embodiments of the present disclosure may be understood by referring to relevant descriptions of the above measurement processing method applied to the network device side. Various processing modules in the measurement processing apparatus of the embodiments of the present disclosure may be implemented using analog circuits, or by executing instructions comprising software for implementing on a network device, the functions described in the embodiments of the present disclosure.

The measurement processing apparatus in the embodiments of the present disclosure can determine whether to configure carrier aggregation and/or dual connectivity based on the clean measurement result of free from IDC interference.

Figure 6:
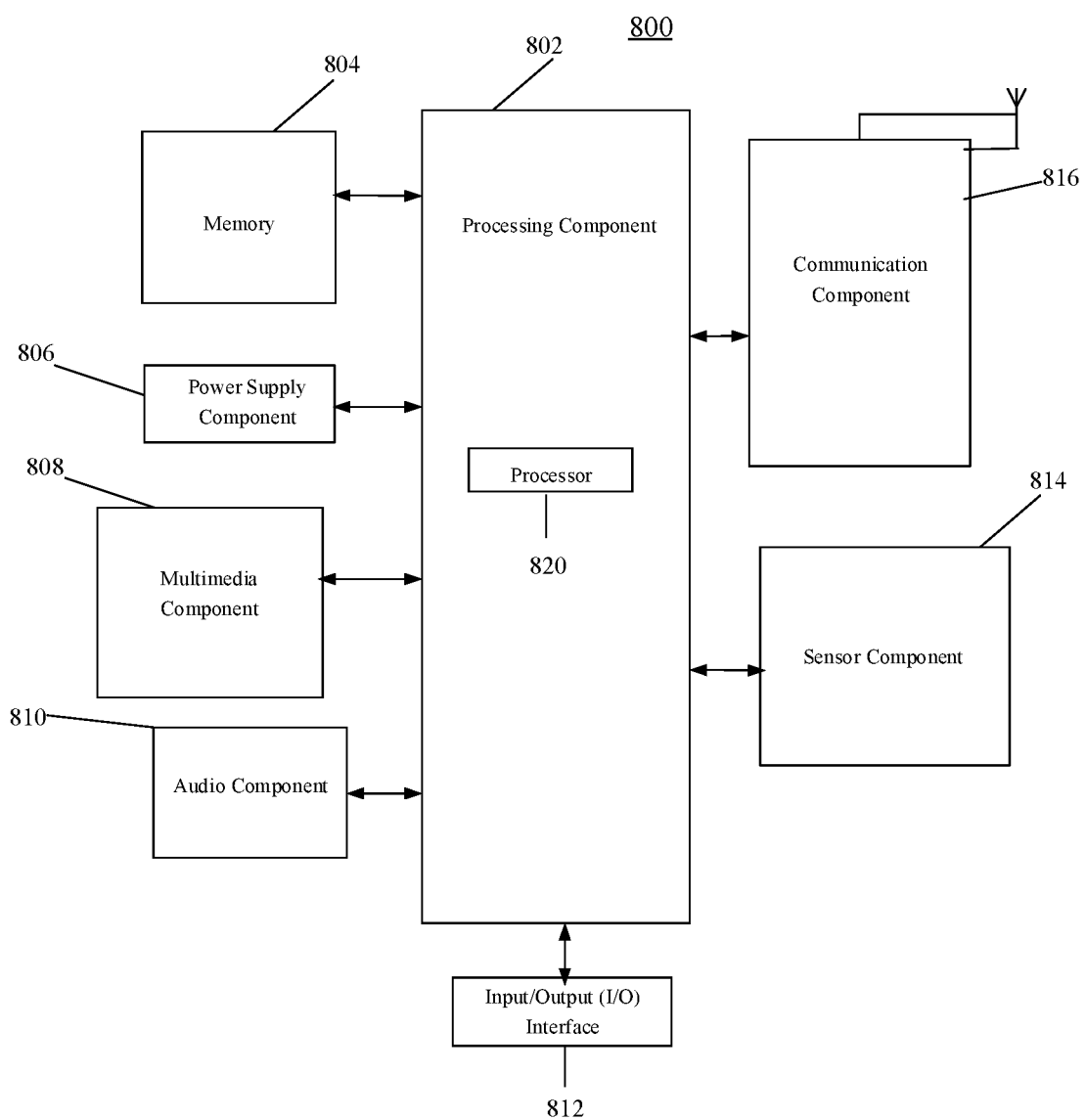
FIG. 6 is a first block diagram illustrating an apparatus for measurement processing according to an embodiment of the present disclosure.

FIG. 6 is a block diagram of an apparatus 800 for implementing measurement processing according to an embodiment of the present disclosure. For example, the apparatus 800 may be a mobile phone, a computer, a digital broadcast terminal, a message transceiver, a game console, a tablet device, a medical device, a fitness device, a personal digital assistant, and the like.

As shown in FIG. 6, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the apparatus 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any application or method operated on the apparatus 800, contact data, phonebook data, messages, pictures, videos, and so on. The memory 804 may be implemented by any type of volatile or non-volatile storage devices or a combination of volatile and non-volatile storage devices, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the apparatus 800. The power supply component 806 may include a power supply management system, one or more power supplies, and other components associated with generating, managing and distributing power for the apparatus 800.

The multimedia component 808 includes a screen that provides an output interface between the apparatus 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some embodiments, the multimedia component 808 includes a front camera and/or a rear camera. When the apparatus 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the apparatus 800. For example, the sensor component 814 may detect an open/closed state of the apparatus 800, and the relative positioning of components, for example, the component is a display and a keypad of the apparatus 800. The sensor component 814 may also detect a change in position of the apparatus 800 or of a component of the apparatus 800, the presence or absence of a user in contact with the apparatus 800, the orientation or acceleration/deceleration of the apparatus 800 and a change in temperature of the apparatus 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as a Wi-Fi, a 2G or a 3G, or a combination of the communication standard above. In an embodiment, the communication component 816 receives broadcast signals or broadcast associated information from an external broadcast management system via a broadcast channel. In an embodiment, the communication component 816 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an embodiment, the apparatus 800 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above measurement processing methods applied to the user equipment side.

In an embodiment, there is further provided a non-transitory computer readable storage medium including executable instructions, such as the memory 804 including executable instructions, where the executable instructions may be executed by the processor 820 of the apparatus 800 to perform the method as described above. For example, the non-transitory computer readable storage medium may be a Random Only Memory (ROM), a Random Access Memory (ROM), a CD-ROM, a magnetic tape, a floppy disk and an optical data storage device and the like.

Figure 7:
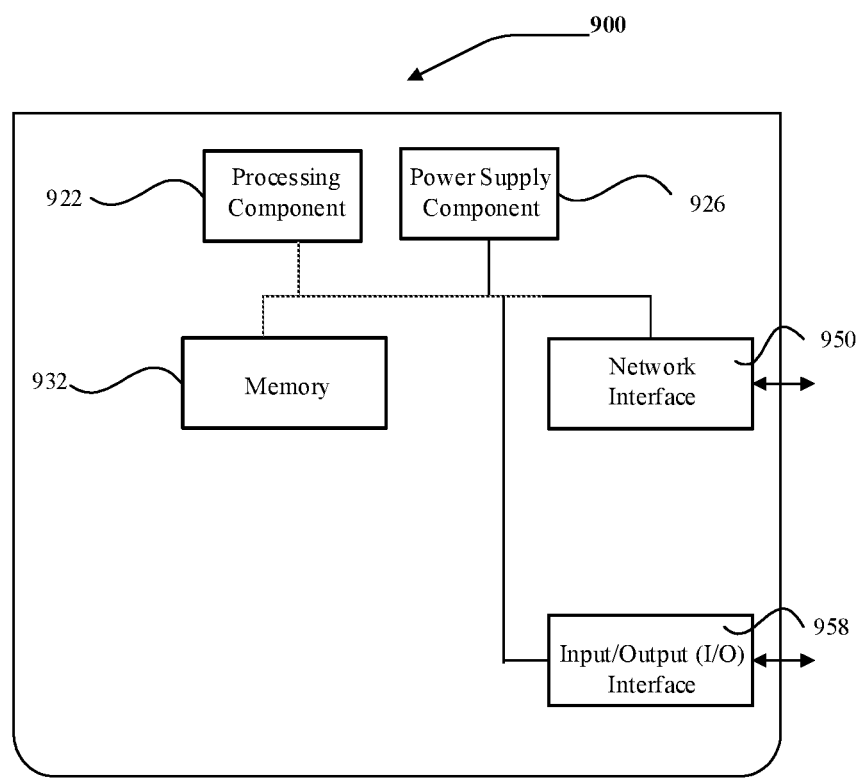
FIG. 7 is a second block diagram illustrating an apparatus for measurement processing according to an embodiment of the present disclosure.

FIG. 7 is a block diagram of an apparatus 900 for measurement processing according to an embodiment of the present disclosure. For example, the apparatus 900 may be provided as a server. As shown in FIG. 7, the apparatus 900 may include a processing component 922 which further includes one or more processors and memory resources represented by a memory 932 for storing instructions executable by the processing component 922, for example, an application program. The application program stored in the memory 932 may include one or more modules, each of which corresponds to one set of instructions. Further, the processing component 922 is configured to execute instructions to perform the above measurement processing method applied to a base station side.

The apparatus 900 further includes one power supply component 926 configured to execute power management for the apparatus 900, one wired or wireless network interface 950 configured to connect the apparatus 1900 to a network, and one input/output (I/O) interface 958. The apparatus 900 may be operated based on an operating system stored in the memory 932, such as Windows Server™, Mac OS X™, Unix™, Linux™ and FreeBSD™ and the like.

Unless there are contraindications, the technical solutions recorded in the embodiments of the present disclosure may be combined in any combination.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims.

The technical solutions provided by the embodiments of the present disclosure have the following beneficial effects.

A UE receives measurement configuration information for an idle state or inactive state and obtains a measurement result by performing signal quality measurement in the idle state or inactive state based on the measurement configuration information. In response to detecting IDC interference in the UE during the signal quality measurement, the UE records the measurement result of free from IDC interference. In this way, the measurement result of free from IDC interference can be reported easily.

It is to be understood that the present disclosure is not limited to the precise structure described above and shown in the accompanying drawings, and that various modifications and changes may be made without departing from the scope thereof. The scope of the present disclosure is limited only by the appended claims.

INDUSTRIAL APPLICABILITY

In the technical solutions of the embodiments of the present disclosure, a UE receives measurement configuration information for an idle state or inactive state; obtains a measurement result by performing signal quality measurement in the idle state or inactive state based on the measurement configuration information; in response to detecting IDC interference in the UE during the signal quality measurement, records the measurement result of free from IDC interference. In this way, the measurement result of free from IDC interference can be easily reported to the network device.

What is claimed is:

1. A measurement processing method comprising:
   receiving, by user equipment (UE), measurement configuration information for an idle state or inactive state;
   based on the measurement configuration information, obtaining, by the UE, a measurement result by performing signal quality measurement in the idle state or inactive state;
   in response to detecting in-device coexistence (IDC) interference in the UE during the signal quality measurement, recording, by the UE, a measurement result of free from IDC interference;
   wherein the method further comprises:
   when performing, by the UE, the signal quality measurement of a first frequency band signal in the idle state or inactive state, stopping sending a second frequency band signal, wherein the second frequency band signal indicates an interference signal for the first frequency band signal.

2. The measurement processing method of claim 1, further comprising:
   the UE entering a connected state;
   in response to the UE entering the connected state, reporting, by the UE, the measurement result of free from IDC interference.

3. The measurement processing method of claim 2, further comprising at least one of:
   when reporting the measurement result of free from IDC interference, in response to detecting IDC interference still in the UE, reporting a detection result that the IDC interference is detected; or
   reporting, by the UE, a measurement result of one or more cells available in the idle state or inactive state, and during or after reporting the measurement result of one or more cells available in the idle state or inactive state, in response to detecting IDC interference still in the UE, reporting, by the UE, a detection result that the IDC interference is detected.

4. The measurement processing method of claim 2, further comprising:
   when recording the measurement result of free from IDC interference, in response to detecting IDC interference in the UE, recording, by the UE, a detection result that the IDC interference is detected; and
   when reporting the measurement result of free from IDC interference, reporting, by the UE, the detection result that the IDC interference is detected.

5. The measurement processing method of claim 1, further comprising:
   receiving by the UE, an IDC indication request;
   sending by the UE, IDC interference indication information based on the IDC indication request;
   wherein the IDC interference indication information is used to determine a solution to eliminate the IDC interference.

6. The measurement processing method of claim 3, wherein reporting the detection result that the IDC interference is detected further comprises:

for each carrier frequency subjected to the IDC interference, reporting, by the UE, a detection result indicating that the IDC interference is detected.

7. The measurement processing method of claim 3, wherein reporting the detection result that the IDC interference is detected further comprises:
for each cell subjected to the IDC interference, reporting, by the UE, a detection result indicating that the IDC interference is detected.

8. The measurement processing method of claim 4, wherein reporting the detection result that the IDC interference is detected further comprises:
for each carrier frequency subjected to the IDC interference, reporting, by the UE, a detection result indicating that the IDC interference is detected.

9. The measurement processing method of claim 4, wherein reporting the detection result that the IDC interference is detected further comprises:
for each cell subjected to the IDC interference, reporting, by the UE, a detection result indicating that the IDC interference is detected.

10. The measurement processing method of claim 1, further comprising:
when none of the second frequency band signal is to be sent, performing, by the UE, the signal quality measurement of the first frequency band signal in the idle state or inactive state.

11. A measurement processing method, comprising:
distributing, by a base station, measurement configuration information for an idle state or inactive state;
wherein the measurement configuration information is used to instruct a user equipment (UE) to obtain a measurement result by performing signal quality measurement in the idle state or inactive state based on the measurement configuration information, wherein the measurement result is a measurement result of free from in-device coexistence (IDC) interference;
wherein the measurement result is determined by: when performing, by the UE, the signal quality measurement of a first frequency band signal in the idle state or inactive state, stopping sending a second frequency band signal, wherein the second frequency band signal indicates an interference signal for the first frequency band signal.

12. The measurement processing method of claim 11, further comprising:
receiving, by the base station, the measurement result of free from IDC interference.

13. The measurement processing method of claim 11, further comprising:
receiving, by the base station, a detection result that the IDC interference is detected.

14. The measurement processing method of claim 13, further comprising:
sending, by the base station, an IDC indication request based on the detection result that the IDC interference is detected;
receiving, by the base station, IDC interference indication information sent by the UE in response to the IDC indication request; and
determining by the base station, a solution to eliminate the IDC interference based on the IDC interference indication information.

15. The measurement processing method of claim 14, wherein:
the IDC indication request is carried in a UE information request message or is a preset Radio Resource Control (RRC) message; and
the IDC interference indication information is carried in a UE information response message or is a preset RRC message.

16. A measurement processing apparatus comprising:
a processor; and
a memory configured to store processor-executable instructions;
wherein, when the processor executes the processor-executable instructions, the processor is configured to perform operations comprising:
receiving measurement configuration information for an idle state or inactive state;
based on the measurement configuration information, obtaining a measurement result by performing signal quality measurement in the idle state or inactive state; and
in response to detecting in-device coexistence (IDC) interference in the UE during the signal quality measurement, recording a measurement result of free from IDC interference;
wherein the processor is further configured to perform operations comprising:
when performing the signal quality measurement of a first frequency band signal in the idle state or inactive state, stopping sending a second frequency band signal, wherein the second frequency band signal indicates an interference signal for the first frequency band signal.

17. A measurement processing apparatus, comprising:
a processor; and
a memory, configured to store processor-executable instructions;
wherein, when the processor executes the processor-executable instructions, the processor is configured to perform the measurement processing method of claim 11.

* * * * *